United States Patent
Morgan

(10) Patent No.: US 6,308,067 B1
(45) Date of Patent: Oct. 23, 2001

(54) WIRELESS COMMUNICATIONS SYSTEM AND METHOD OF OPERATION FOR REDUCING FRAUD

(75) Inventor: Joseph LaMance Morgan, Charlotte, NC (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/745,214

(22) Filed: Dec. 21, 2000

Related U.S. Application Data

(63) Continuation of application No. 09/451,589, filed on Nov. 30, 1999.

(51) Int. Cl.[7] .................................................. H04Q 7/20
(52) U.S. Cl. ......................... 455/433; 455/410; 455/407; 455/432; 455/461; 379/207; 379/88.02
(58) Field of Search .................................... 455/410, 461, 455/433, 432, 435, 422, 411, 456, 466, 511, 567, 407; 379/207, 88.02

(56) References Cited

U.S. PATENT DOCUMENTS

| | | |
|---|---|---|
| 4,756,020 | 7/1988 | Fodale . |
| 4,852,149 | 7/1989 | Zwick et al. . |
| 4,860,341 | 8/1989 | D'Avello et al. . |
| 5,046,085 | 9/1991 | Godsey et al. . |
| 5,046,088 | 9/1991 | Margulies . |
| 5,109,401 | 4/1992 | Hattori et al. . |
| 5,127,040 | 6/1992 | D'Avello et al. . |
| 5,127,041 | 6/1992 | O'Sullivan . |
| 5,134,651 | 7/1992 | Ortiz et al. . |
| 5,138,650 | 8/1992 | Stahl et al. . |
| 5,144,649 | 9/1992 | Zicker et al. . |
| 5,220,593 | 6/1993 | Zicker et al. . |

(List continued on next page.)

FOREIGN PATENT DOCUMENTS

| | | |
|---|---|---|
| 467534 A2 * | 1/1992 | (EP) . |
| 0698987A2 | 2/1996 | (EP) . |
| 2280085A | 1/1995 | (GB) . |
| WO92/22174 | 12/1992 | (WO) . |
| WO96/36192 | 11/1996 | (WO) . |

OTHER PUBLICATIONS

U.S. Ser. No. 467,534, McCombe, filed Jan. 1992.
PCT International Search Report, dated Jan. 31, 1997.

*Primary Examiner*—William Trost
*Assistant Examiner*—Marceau Milord

(57) ABSTRACT

The wireless communications system includes a home carrier and a HLR memory, associated with the home carrier, for storing a number of Home Locator Records defining the level of service to be provided to the individual subscribers of the home carrier. The Home Locator Record is at least initially configured to prohibit call termination of the respective subscriber outside of the predetermined service area of the home carrier. However, the wireless communications system also includes reconfiguring devices for at least temporarily reconfiguring the Home Locator Record of a respective subscriber in response to a request for communications service involving the subscriber who has roamed outside of the predetermined service area of the home carrier if the subscriber has prepaid for the requested services. Once reconfigured, the wireless communications system can provide the Home Locator Record of the respective subscriber to a serving carrier via IS-41 (Rev. A) messaging. The reconfigured Home Locator Record serves as the roaming subscriber's Visitor Locator Record which, in turn, authorizes the requested wireless communications service. Once the requested service has been ended, either upon completion of the call or exhaustion of the prepaid services, the reconfiguring devices resets the Home Locator Record of the respective subscriber such that the Home Locator Record again prohibits call termination with the subscriber outside of the service area of the home carrier in order to further protect the wireless communications system from fraud.

2 Claims, 3 Drawing Sheets

U.S. PATENT DOCUMENTS

| | | |
|---|---|---|
| 5,233,642 | 8/1993 | Renton . |
| 5,265,155 | 11/1993 | Castro . |
| 5,274,802 | 12/1993 | Altine . |
| 5,291,543 | 3/1994 | Freese et al. . |
| 5,297,189 | 3/1994 | Chabernaud . |
| 5,309,501 | 5/1994 | Kozik et al. . |
| 5,321,735 | 6/1994 | Breeden et al. . |
| 5,327,144 | 7/1994 | Stilp et al. . |
| 5,341,414 | 8/1994 | Popke . |
| 5,353,331 | 10/1994 | Emery et al. . |
| 5,353,335 | 10/1994 | D'Urso et al. . |
| 5,359,182 | 10/1994 | Schilling . |
| 5,359,642 | 10/1994 | Castro . |
| 5,400,390 * | 3/1995 | Salin ................................ 379/99 |
| 5,423,068 | 6/1995 | Hecker . |
| 5,428,665 | 6/1995 | Lantto . |
| 5,434,798 | 7/1995 | Madebrink et al. . |
| 5,440,621 | 8/1995 | Castro . |
| 5,490,201 | 2/1996 | Moberg et al. . |
| 5,509,056 | 4/1996 | Ericsson et al. . |
| 5,557,655 | 9/1996 | Lantto . |
| 5,561,706 | 10/1996 | Fenner . |
| 5,561,840 | 10/1996 | Alvesalo et al. . |
| 5,561,854 | 10/1996 | Antic et al. . |
| 5,577,101 | 11/1996 | Böhm . |
| 5,579,379 | 11/1996 | D'Amico et al. . |
| 5,583,916 | 12/1996 | Mäenpää . |
| 5,590,175 | 12/1996 | Gallant et al. . |
| 5,592,535 | 1/1997 | Klotz . |
| 5,606,596 * | 2/1997 | Jain et al. ........................... 379/59 |
| 5,623,532 | 4/1997 | Houde et al. . |
| 5,631,947 | 5/1997 | Wittstein et al. . |
| 5,670,950 | 9/1997 | Otsuka . |
| 5,673,306 | 9/1997 | Amadon et al. . |
| 5,680,440 | 10/1997 | Ghisler et al. . |
| 5,722,067 | 2/1998 | Fougnies et al. . |
| 5,748,720 * | 5/1998 | Loder ............................. 379/144 |
| 5,787,347 * | 6/1998 | Yude et al. ..................... 455/440 |
| 6,131,026 * | 10/2000 | Badillo ........................... 455/428 |
| 6,134,316 * | 10/2000 | Kallioniemi et al. ............ 379/220 |
| 6,167,264 * | 12/2000 | Palviainen et al. .............. 455/433 |

\* cited by examiner

WIRELESS COMMUNICATIONS SYSTEM AND METHOD OF OPERATION FOR REDUCING FRAUD

This application is a Continuation of Ser. No. 09/451,589, filed Nov. 30, 1999.

BACKGROUND OF THE INVENTION

The use of wireless communications and, in particular, the use of cellular telephony as a means of personal communication is perceived by many as having experienced substantial, if not exponential growth in recent years. While growth and expansion in the use of cellular telephony for personal communication has been phenomenal in many respects, there still exists significant obstacles for expansion of its use to a large segment of the general population.

As in many emerging industries, the cellular telephony industry has been plagued and victimized by the relatively small segment of the public intent on defrauding the service providers or carriers. This relatively small segment of the public has found a variety of means for circumventing these existing safeguards. It is estimated that fraud by these "consumers" costs the cellular industry more than three million dollars per day.

As a result of the rampant growth of fraud in the cellular industry, carriers have been forced to adopt various techniques designed to reduce the opportunities for defrauding the carrier. An obvious method is to limit system access solely to those subscribers deemed highly creditworthy and to maintain listings of those former subscribers who have, in the past, defrauded the carriers. The primary problem with this approach is that it excludes the significantly larger segment of the general population comprised of otherwise trustworthy individuals desiring cellular services who fall short of the highly creditworthy standard. As a result, this approach severely restricts the potential opportunities for growth at a time when further growth is both desired, if not essential, to the expansion of the cellular telephony industry.

Efforts to reduce the relative exposure of the carrier in monetary terms to these unscrupulous practices have also been hindered by the veritable plethora of features and options now available to users of various forms of wireless communication including cellular telephony. Perhaps the most desired feature for the cellular subscriber is the ability to "roam" in areas which are not serviced by the home carrier. These features and options are virtually demanded by the consumer, but the liability associated with the utilization of these features are borne, at least initially, by the home carrier. The home carrier does not, however, retain control over the extent of the use of these features and options in all potential markets since access to a service and feature may be authorized in areas serviced by other carriers without the real time knowledge of the home carrier.

The inability to selectively control access to the various features available to users of wireless communication stems from the fundamental nature of the wireless communications industry and the basic fact that it relies on a network of different carriers in order to provide service of any meaningful geographic scope. Before providing local connectivity to a visiting cellular subscriber, a "remote" or serving carrier first verifies the creditworthiness of the subscriber or, more aptly, verifies that the home carrier accepts financial responsibility for any fees incurred by its subscriber. In this regard, each cellular subscriber is identified by a combination of a discrete Mobile Identification Number (MIN) and a specific Electronic Serial Number (ESN) which are passed from the "remote" cellular carrier to the subscriber's home carrier by existing IS-41 (Rev. A) messaging protocols in response to a request for service by a subscriber roaming within the service area of the remote carrier. Based upon the MIN/ESN, the home carrier electronically verifies whether the cellular subscriber may have access to the requested services.

In particular, the home carrier maintains a Home Locator Record (HLR) associated with each subscriber which provides data relating to the particular subscriber, including data identifying those features and options available to the subscriber. In conventional cellular systems, the Home Locator Record is typically configured, in advance, by an operator and cannot be altered by the carrier during the verification process. Thereafter, upon request for wireless communications service involving a subscriber of the home carrier within the service area of a "remote" serving carrier, the home carrier transmits the subscriber's Home Locator Record to the serving carrier to create the subscriber's Visitor Locator Record (VLR) which defines the type and level of service to be provided to the roaming subscriber.

One method for reducing the exposure of a carrier to fraud would be to provide local, prepaid wireless communications services. In accordance with this approach, a carrier may integrate existing systems utilized for billing purposes, for example, to monitor the actual time used by the cellular subscriber and, when the subscriber is approaching the prepaid limit, correspondingly restrict and/or terminate service, thereby limiting the carrier's relative exposure. The problem with this approach, however, is that the prepaid services must generally be limited to the geographic area served by the home carrier such that the cellular subscriber is not allowed to roam since the extent of usage outside of the home carrier's service area cannot be monitored or restricted.

While a wireless communications system can control call origination by populating the "HOTLINE" field of the subscriber's Visitor Locator Record (VLR) with the telephone number of a switching platform which, in turn, determines if the subscriber has paid in advance for the cellular service, the problems associated with call termination with a prepaid subscriber have not been addressed. In this regard, the problems associated with call termination with a prepaid subscriber are exacerbated in comparison to call origination because an incoming call for the subscriber may be placed directly to the roaming access port of the "remote" serving carrier.

There is, therefore, an existing need in the wireless communications industry and, in particular, in the cellular telephony industry for a wireless communications system and an associated method of operation which permits a carrier to limit its exposure to potential consumer fraud, while allowing subscribers to have access to the full range of features and options, including roaming and, more particularly, call termination with the subscriber while the subscriber is roaming.

SUMMARY OF THE INVENTION

The foregoing shortcomings in existing wireless communications systems are overcome in accordance with the present invention by temporarily reconfiguring the information maintained in the subscriber's (otherwise permanent) Home Locator Record on a real-time basis in order to selectively permit call termination while the subscriber is roaming in foreign markets, i.e., service areas other then the home carrier's service area. However, the subscriber's Home Locator Record is only reconfigured in response to a request for wireless communications service if the subscriber has paid in advance for the requested service, such as roaming, and wishes to receive a call. During the course of a call, the amount of remaining prepaid services is monitored and the service is ended once the prepaid amount has been exhausted. Upon completion of the requested service, the subscriber's Home Locator Record is reset to again prohibit call termination, thereby further protecting the home carrier from fraud. For example, the home carrier is protected from subsequent attempts to contact a roaming subscriber via the roaming access port of the serving carrier since call termination is not allowed absent reconfiguring of the subscriber's Home Locator Record.

The wireless communications system of the present invention includes a home carrier and HLR memory means, associated with the home carrier, for storing a Home Locator Record database. The Home Locator Record database includes a number of Home Locator Records defining the service to be provided the subscribers of the home carrier. The Home Locator Record is at least initially configured to allow only hotline call origination and to prohibit call termination with the respective subscriber.

The wireless communications system also includes reconfiguring means for temporarily reconfiguring the Home Locator Record of a respective subscriber in response to a request for communications service involving the subscriber receiving an incoming call. For example, the request can be a request for call termination with a subscriber who has roamed outside of the service area of the home carrier. In response to this request, the reconfiguring means reconfigures the Home Locator Record of the respective subscriber to permit call termination if the subscriber has paid in advance for the requested service.

In response to requests for wireless communications service involving a subscriber of the home carrier who has roamed outside of the service area of the home carrier, the wireless communications system and method initially determines if the subscriber has paid in advance for the requested service. In this regard, the wireless communications systems can include account memory means for storing account information for the subscribers of the home carrier. This account information can include information relating to the particular services, such as long distance and roaming, which have been paid in advance by respective ones of the subscribers. Upon determining that the subscriber has adequate funds in its account for the requested service and a call is waiting to be delivered to the subscriber, the reconfiguring means at least temporarily reconfigures the Home Locator Record of the respective subscriber to permit call termination. The wireless communications system and method then provides the reconfigured Home Locator Record of the respective subscriber to a serving carrier (typically via IS-41 (Rev. A) messaging) which, in turn, provides the requested wireless communications service.

During the provision of the requested service by the serving carrier, the wireless communications system and method monitors the account memory means and ends the requested service once the account information for the respective subscriber indicates that the services which had been paid in advance by the subscriber have been exhausted. Once the requested service has been ended, either upon completion of the call or exhaustion of the prepaid services, the reconfiguring means resets the Home Locator Record of the respective subscriber such that the Home Locator Record again prohibits call termination with the subscriber. As a result, the wireless communications system is further protected from fraud since calls to the roaming subscriber via the roaming access port of the serving carrier will not be connected since the Home Locator Record of the respective subscriber has been reset to again prohibit call termination with the subscriber.

In this manner, a particular subscriber may have access on a discrete transaction-by-transaction basis to features of the wireless communications system which are considered generally desirable, such as call termination with a roaming subscriber. Meanwhile, the home carrier may substantially limit its relative exposure to the illicit practices of the relatively small segment of the potential consuming market for wireless communications services. Accordingly, carriers can increase the universe of potential subscribers to include consumers who are slightly less creditworthy since the relative exposure of the carrier is limited according to the present invention.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, and wherein.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 1:
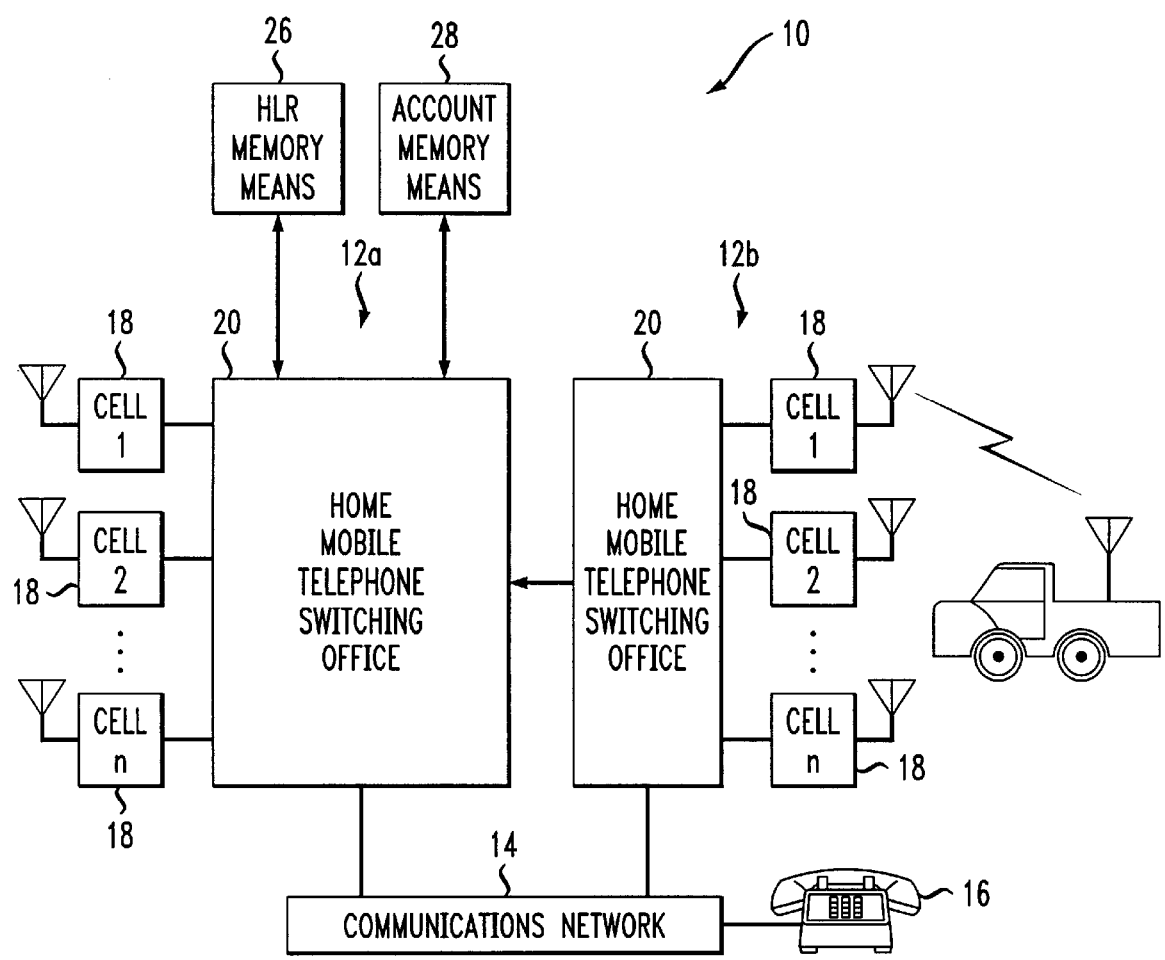
FIG. 1 is a schematic block diagram illustrating the basic components of a wireless communications system according to the present invention, including a home carrier having HLR memory means and account memory means associated therewith.

Referring now to FIG. 1, a wireless communications system 10 according to one embodiment of the present invention is illustrated. While this communications system will be primarily described hereinbelow in conjunction with a cellular telephony system, the wireless communications system can include any cellular or digital communications system, such as an AMPS cellular system, a digital cellular system or a Personal Communications System, without departing from the spirit and scope of the present invention.

The wireless communications system 10 typically includes a plurality of carriers 12 for providing wireless communications service within respective predetermined service areas. The carriers are generally connected with a communications network 14, such as an associated public switched telephone network which, in turn, is associated and in communication with one or more terminals, such as the land line telephone terminal 16 illustrated in FIG. 1. For a cellular telephony system, for example, a duplex communications link may be effected between two cellular terminals, or between a cellular terminal and a land line telephone terminal.

Each carrier 12 provides wireless communications service to a number of subscribers within the predetermined service area of the carrier. A particular subscriber will therefore have a home carrier 12a with which the subscriber has contracted for wireless communications service, and a number of "remote" carriers having different service areas which may function as serving carriers 12b in instances in which the subscriber is roaming outside of the service area of the home carrier, but with the service area of a respective serving carrier. For a cellular communications system, the service area of a cellular carrier is divided into a number of cells 18 designated Cell 1, Cell 2, ..., Cell n in FIG. 1. In addition to the radio base stations and the associated antennas within each respective cell, a carrier includes a mobile telephone switching office (MTSO) 20 which serves as the central coordinating element for all cells and which typically includes a processor 22, such as a computer-based account processor, and a telephony switch 24. The MTSO also generally interfaces with the telephone company zone offices, controls call processing and handles billing activities.

According to the present invention, the home carrier 12a is associated with both HLR memory means 26 and account memory means 28. The HLR memory means and/or the account memory means may form a portion of the home carrier's MTSO 20. Alternatively, the HLR memory means and/or the account memory means may be external to, but in communication with the home carrier's MTSO as shown in FIGS. 1 and 2.

The HLR memory means 26 typically includes a memory device for storing a Home Locator Record database. The Home Locator Record database includes a number of Home Locator Records defining the wireless communications service to be provided to respective subscribers of the home carrier 12a. For example, the Home Locator Record of a respective subscriber defines the features and options which the subscriber has selected. One feature of the many features defined by a subscriber's Home Locator Record is call termination which indicates whether the subscriber is allowed to receive calls, including calls received while the subscriber roams outside of the predetermined service area of the home carrier.

The account memory means 28 also typically includes a memory device for storing account information for each of the subscribers of the home carrier 12a. According to the present invention, the subscribers can pay in advance for selected wireless communications services. For example, subscribers can pay in advance for a full featured wireless communications system 10 that controls all facets of wireless communications regardless of the subscriber's location, i.e., at home or while roaming, in a manner which removing the liability of the home carrier.

Figure 2:
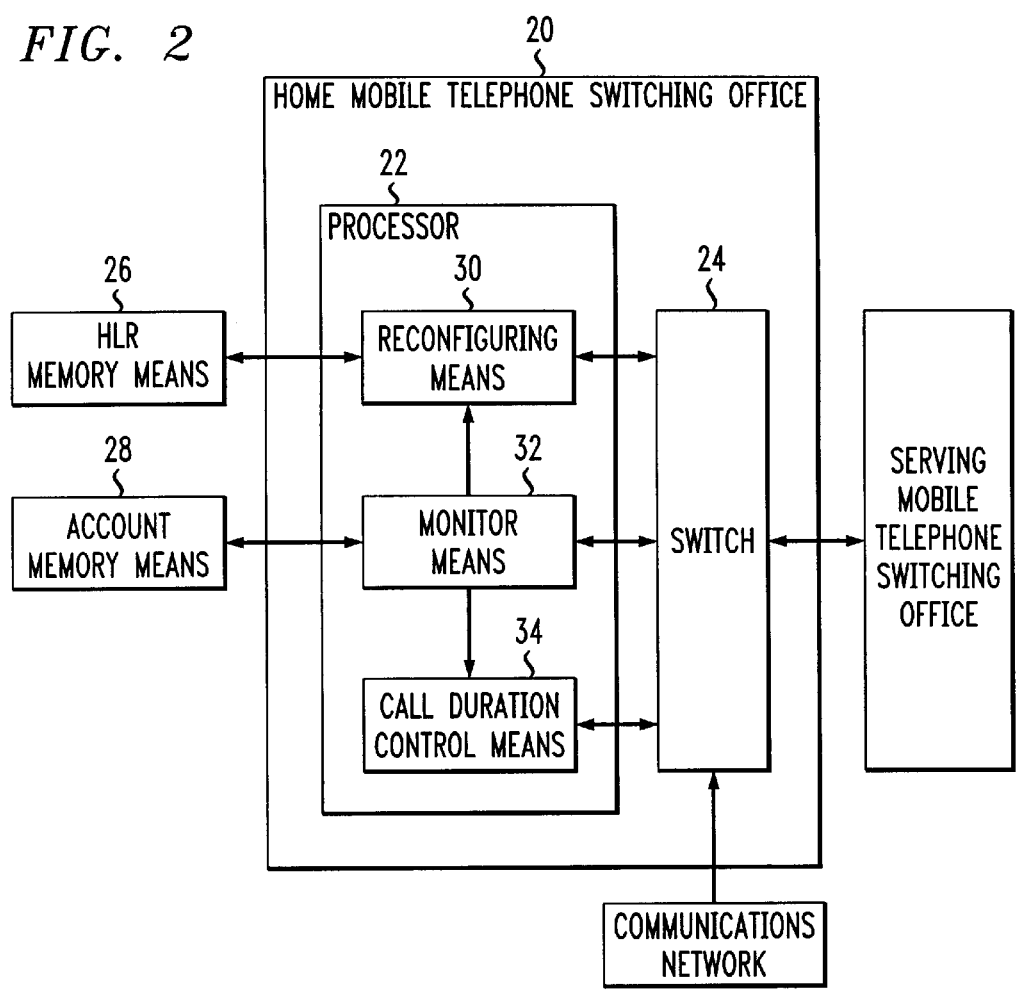
FIG. 2 is a schematic block diagram of a wireless communications switching platform according to one embodiment of the present invention.

As shown in FIG. 2, the MTSO 20 of the home carrier 12a has been specifically developed as a switching platform for providing wireless communications service to a number of subscribers, while protecting the home carrier from fraud. As shown in FIG. 2, the switching platform of the present invention includes reconfiguring means 30 for at least temporarily reconfiguring the Home Locator Record of a respective subscriber in response to a request for wireless communications service involving the subscriber outside the predetermined service area of the home carrier. For example, this request may be an incoming call requesting call termination with the respective subscriber outside of the predetermined service area of the home carrier.

As explained below, the reconfiguring means 30 is responsive to the account memory means 28 so as to only reconfigure the Home Locator Record of the respective subscriber if the stored account information indicates that the subscriber has paid an advance for the requested wireless communications service. If the subscriber has paid an advance for the requested wireless communications service, the reconfiguring means will temporarily reconfigure the Home Locator Record of the respective subscriber to permit the requested feature, i.e., call termination, while the subscriber roams outside of the service area of the home carrier 12a. While the reconfiguring means will hereinafter be described in conjunction with the reconfiguring of a Home Locator Record to permit call termination, including call termination outside of the predetermined service area of the home carrier, the reconfiguring means may reconfigure the Home Locator Record to selectively permit the subscriber to temporarily utilize other features while the subscriber roams outside of the predetermined service area of the home carrier.

Upon completion of the requested wireless communications service, the reconfiguring means 30 resets the Home Locator Record of the respective subscriber to again prohibit the requested feature, such as to prohibit call termination with the subscriber outside the predetermined service area of the home carrier 12a. As described below, the switching platform 20 of the present invention therefore reduces, if not prevents, fraud by only permitting call termination while roaming outside of the predetermined service area of the home carrier in specific instances in which the subscriber has paid in advance.

As also shown in FIG. 2, the switching platform 20 can include monitor means 32 for monitoring the account memory means 28 while the switching platform provides the requested wireless communications service. In instances in which a subscriber's Home Locator Record has been temporarily reconfigured to permit call termination, the monitor means can continue to monitor the account information relating to the wireless communications services which have been paid in advance by the respective subscriber while the subscriber roams outside of the predetermined service area of the home carrier 12a. In this regard, once the subscriber begins to use the prepaid wireless communications services, the account information for the respective subscriber is modified, preferably in real time by the processor 22, in order to accurately reflect the remaining prepaid services available for the respective subscriber.

The switching platform 20 also preferably includes call duration control 34 for ending the requested wireless communications service. Once the account information indicates that all of the wireless communications services which had been paid in advance by the respective subscriber have been exhausted, the monitor means 22 notifies the call duration control means. The call duration control means then ends the wireless communications service, such as by disconnecting the subscriber's telephone call.

As described above, the switching platform 20 also includes a switch 24, such as a telephony switch, and a processor 22, such as a computer-based account processor. As shown in FIG. 2, the processor can include the reconfiguring means 30, the monitor means 32 and the call duration control means 34. However, the reconfiguring means, the monitor means and/or the call duration control means of one advantageous embodiment are embodied by a combination of hardware, such as the processor, and software, such as a computer program product. The computer program product of this advantageous embodiment includes a computer-readable storage medium having computer-readable program code means, such as a series of computer instructions, embodied in the computer-readable storage medium for selectively reconfiguring the Home Locator Records of respective ones of the subscribers, for monitoring the account memory means and/or for selectively ending the wireless communications service of respective ones of the subscribers.

In this regard, FIGS. 1–4 are block diagram, flow chart and control flow illustrations of methods, systems and program products according to the invention. It will be understood that each block or step of the block diagram, flow chart and control flow illustrations, and combinations of blocks in the block diagram, flow chart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flow chart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flow chart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flow chart or control flow block(s) or step(s).

Accordingly, blocks or steps of the block diagram, flow chart or control flow illustrations support combinations of means for performing the specified functions, combinations of steps for performing the specified functions and program instruction means for performing the specified functions. It will also be understood that each block or step of the block diagram, flow chart or control flow illustrations, and combinations of blocks or steps in the block diagram, flow chart or control flow illustrations, can be implemented by special purpose hardware-based computer systems which perform the specified functions or steps, or combinations of special purpose hardware and computer instructions.

Figure 4:
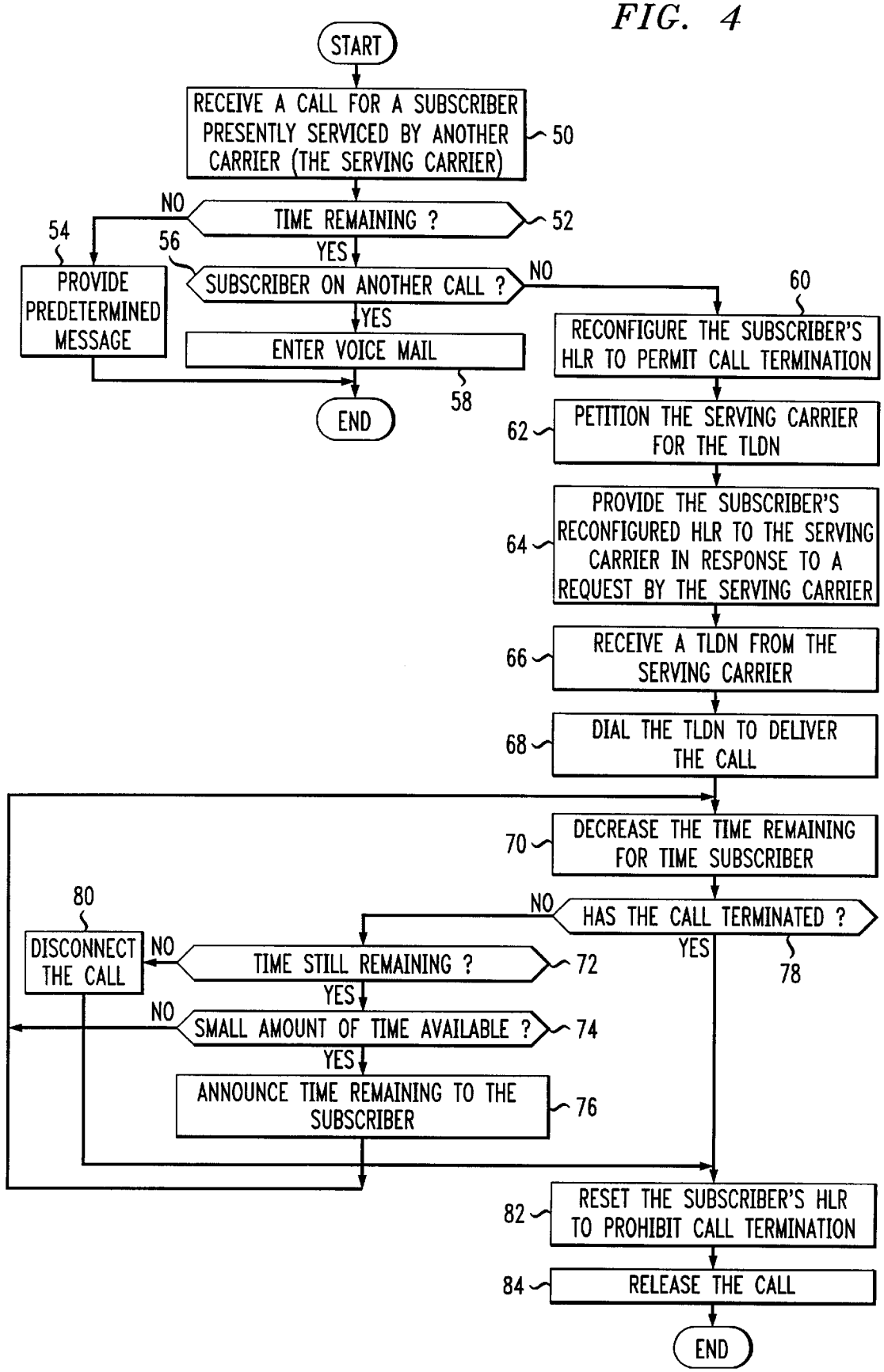
FIG. 4 is a flow chart illustrating the operations performed by a wireless communications system and method according to one embodiment.

The operations of the wireless communications system 10 of the present invention will now be described primarily in conjunction with the flow chart of FIG. 4. As shown in block 50, the wireless communications system initially receives a request for wireless communications service involving the subscriber outside of the predetermined service area of the home carrier 12a of the subscriber. For example, the switching platform 20 of the present invention and, more particularly, the switch 24 may receive a call for a subscriber who is presently in a region serviced by another carrier, i.e., the serving carrier 12b. In one embodiment, each subscriber of the wireless communications system of the present invention is assigned a unique telephone number, such as a unique toll-free number or a common toll-free number with a unique personal identification number (PIN). Upon receiving a call to the telephone number assigned to a respective subscriber, the switching platform initially identifies the mobile identification number (MIN) and Electronic Serial Number (ESN) of the subscriber based upon the subscriber's unique toll-free number or the subscriber's unique PIN.

Thereafter, the switching platform 20 and, more particularly, the monitor means 32 determines if the subscriber has paid in advance for the requested wireless communications service, such as for roaming or, more particularly, for call termination while the subscriber is roaming. See block 52. If the account information for the respective subscriber indicates that the subscriber has not paid for any services in advance which have not been previously used or exhausted, the switching platform provides a message to the caller, such as "the cellular phone that you have dialed is temporarily out of service", prior to disconnecting. See block 54. If the subscriber has paid in advance for the requested wireless communications service, however, the switching platform determines if the subscriber is currently on another call. See block 56. If so, the switching platform preferably transfers the incoming call to voice-mail such that the caller can leave a message for the subscriber as shown in block 58.

If the subscriber has paid in advance for the requested wireless communications service and the subscriber is not on another call, the switching platform 20 and, more particularly, the reconfiguring means 30 temporarily reconfigures the Home Locator Record of the respective subscriber to permit call termination such that the request for call termination with the subscriber who is presently outside of the service area of the home carrier 12a can be accommodated, i.e., the call can be completed. See block 60. Once the Home Locator Record of the respective subscriber has been reconfigured, the serving carrier 12b is petitioned for a temporary local dial number (TLDN). See block 62. In the embodiment illustrated in FIG. 1, the switching platform of the present invention may petition the serving carrier, such as via switch-to-switch communications (SS-7), for a TLDN. In the embodiment illustrated in FIG. 3, however, the HLR memory means 26 is one component of an HLR node 36 which is adapted to communicate with both the switching platform, i.e., the home MTSO, and the serving carrier, i.e., the serving MTSO. In this embodiment, the home carrier can issue an intracarrier petition to the serving carrier, via the HLR node, for a TLDN once the Home Locator Record of the respective subscriber has been reconfigured.

Figure 3:
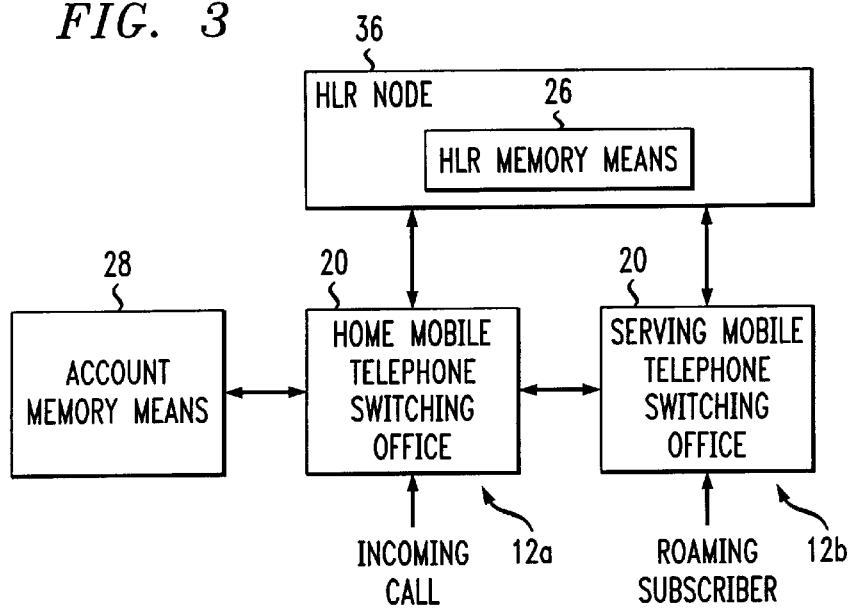
FIG. 3 is a schematic block diagram illustrating the various communications links within a wireless communications system according to another embodiment of the present invention.

In either embodiment and in response to the home carrier's request for a TLDN, the serving carrier 12b requests a Visitor Locator Record from the home carrier 12a. As described above, a subscriber's Visitor Locator Record is based upon the current Home Locator Record of the respective subscriber. Accordingly, the wireless communications system 10 of the present invention reconfigures the Home Locator Record of the respective subscriber before sending the subscriber's current Visitor Locator Record to the serving carrier, either via the switching platform 20 or via the HLR node 36, to thereby create or update the subscriber's Visitor Locator Record which is maintained by the serving carrier. See block 64. Since the reconfigured Home Locator Record now permits call termination with the respective subscriber, the serving carrier then provides the switching platform with a TLDN. See block 66. For example, the serving carrier can provide the switching platform with a TLDN for the respective subscriber via switch-to-switch communications as shown in FIG. 1 or via intracarrier signals, such as the HLR node, as shown in FIG. 3. Upon receipt of the TLDN, the switching platform and, more particularly, the switch 24 dials with TLDN to deliver the incoming call. See block 68.

Following call delivery and during the period of time in which the subscriber's phone remains off-hook, the account information within the account memory means 28 which relates to the respective subscriber is modified to effectively decrease the amount of remaining wireless communications services which have been prepaid by the subscriber and which remain to be provided to the subscriber. See block 70. For example, the processor 22 may repeatedly decrement the prepaid time remaining for the respective subscriber as the subscriber's phone remains off-hook.

As shown in block 78, the switching platform 20 also repeatedly determines if the subscriber has completed the telephone call, such as by placing the phone on-hook or by otherwise signing off. If the switching platform determines that the telephone call has not been completed, the switching platform 20 and, more particularly, the monitor means 32 continues to monitor the account information for the respective subscriber to determine if the subscriber has prepaid for and is entitled to additional wireless communications service. See block 72. If the account information for the respective subscriber indicates that the subscriber has exhausted all of their prepaid services, the monitor means notifies the call duration control means 34 which, in turn, ends the service, i.e., disconnects the telephone call. See block 80. If the account information for the respective subscriber indicates that the subscriber is entitled to additional service, however, the monitor means then determines if the wireless communications services which have been prepaid by the subscriber and which remain to be provided are small, such as less than ten minutes. See block 74. If so, the switching platform can announce the time remaining to the subscriber such that the subscriber can plan to complete the telephone call within the remaining time. See block 76. Otherwise, this monitoring process can continue as shown in FIG. 4.

If the call has ended, either by action of the respective subscriber or by the call duration control means 34 upon exhaustion of the prepaid services, the switching platform 20 and, more particularly, the reconfiguring means 30 will reset the Home Locator Record of the subscriber so as to prohibit call termination, prior to releasing the telephone call. See blocks 82 and 84. By resetting the Home Locator Record of the subscriber to prohibit call termination, the wireless communications system 10 of the present invention reduces, if not prevents fraud by not allowing unauthorized access to any subscriber. In particular, subsequent telephone calls to the roaming access port of the serving carrier 12b which request call termination with a roaming subscriber of the home carrier 12a will not be completed since the Home Locator Record of the respective subscriber which is provided to the serving carrier would again indicate that the subscriber is prohibited from receiving calls. Accordingly, the wireless communications system and method of the present invention permit call termination with a roaming subscriber on a limited, prepaid basis, while reducing, if not preventing, fraud upon the home/serving carrier. As a result, carriers can increase the universe of potential subscribers to include consumers who are slightly less creditworthy since the relative exposure of the carrier is limited according to the present invention.

In the drawings and the specification, there has been set forth a preferred embodiment of the invention and, although specific terms are employed, the terms are used in a generic and descriptive sense only and not for purpose of limitation, the scope of the invention being set forth in the following claims.

That which is claimed is:

1. A wireless communications system, comprising:
    a home carrier for providing wireless communications service to a subscriber within a predetermined service area;
    HLR memory means, associated with said home carrier, for storing a home locator record database comprising a plurality of home locator records at least partially defining the wireless communications service to be provided to respective ones of the subscribers of said home carrier, wherein the home locator record is at least initially configured to prohibit call termination with the respective subscriber; and
    reconfiguring means for at least temporarily reconfiguring the home locator record of a respective subscriber in response to a request for wireless communications service involving the subscriber to permit call termination with the subscriber if the subscriber has paid in advance for the requested wireless communications service, wherein said reconfiguring means resets the home locator record of the respective subscriber upon completion of the requested wireless communication service such that the home locator record again prohibits call termination with the subscriber.

2. A wireless communications switching platform for selectively providing wireless communications service to a plurality of subscribers, wherein the wireless communications service to be provided to a respective subscriber is at least partially defined by a home locator record which is at least initially configured to prohibit call termination with the subscriber outside of a predetermined service area, and wherein the wireless communications switching platform comprises:
    account memory means for storing account information for the plurality of subscribers; and
    reconfiguring means, responsive to said account memory means, for at least temporarily reconfiguring the home locator record of a respective subscriber in response to a request for wireless communications service when the subscriber is roaming outside of the predetermined service area to permit call termination with the subscriber if the stored account information indicates that the subscriber has paid in advance for the requested wireless communications service, wherein said reconfiguring means resets the home locator record of the respective subscriber upon completion of the requested wireless communications service such that the home locator record again prohibits all termination with the subscriber outside of the predetermined service area.

* * * * *